W. WILLET & O. E. BOWEN.
AUTO TURN JACK.
APPLICATION FILED FEB. 7, 1913.

1,088,953.

Patented Mar. 3, 1914.
2 SHEETS—SHEET 1.

WITNESSES
M. Ray Taylor
Walter P. Geyer.

INVENTORS
Warren Willet,
Otis E. Bowen,
BY Geyer & Popp
ATTORNEYS

W. WILLET & O. E. BOWEN.
AUTO TURN JACK.
APPLICATION FILED FEB. 7, 1913.
1,088,953.
Patented Mar. 3, 1914.
2 SHEETS—SHEET 2.
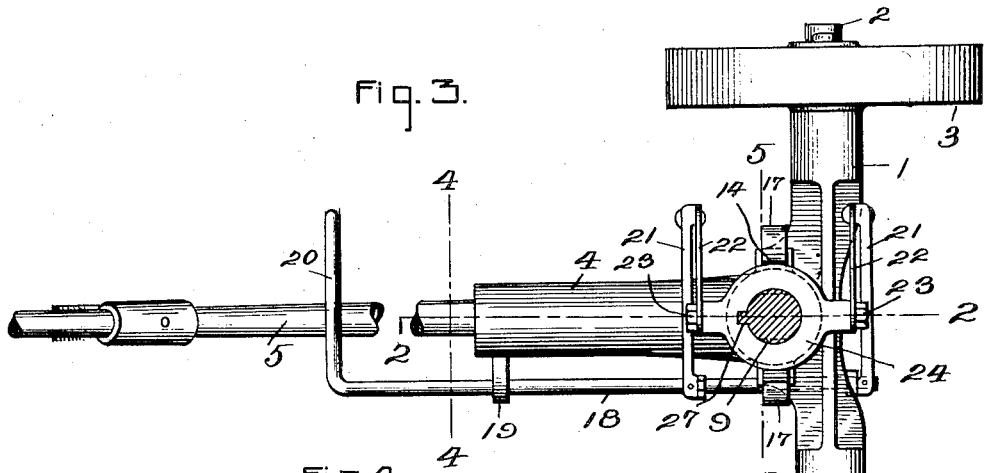
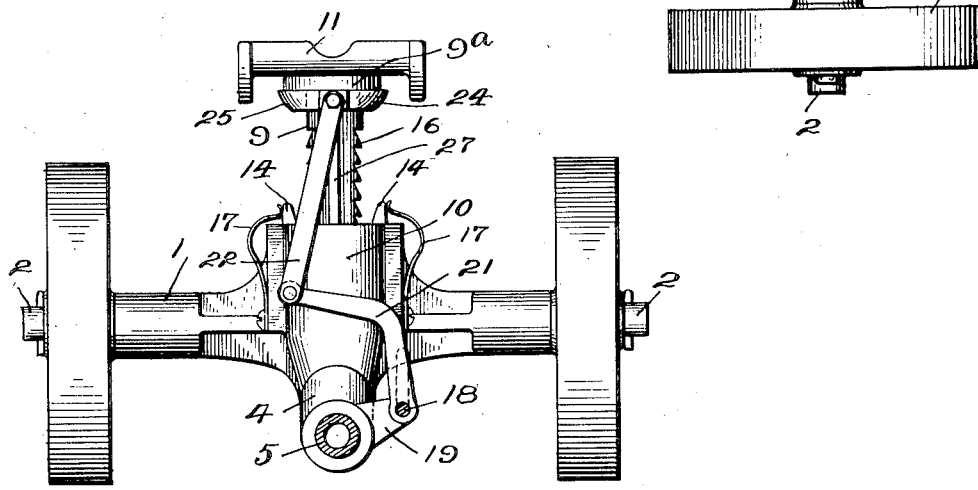
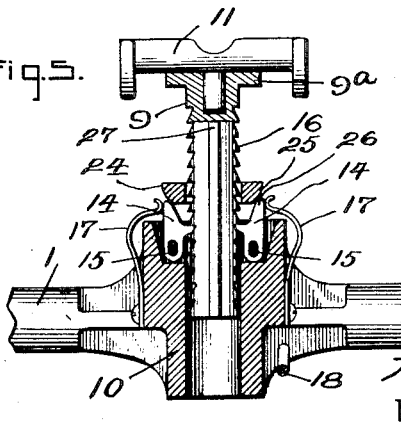
WITNESSES
W. Ray Taylor
Walter P. Geyer
INVENTORS
Warren Willet,
Otis E. Bowen.
BY Geyer & Popp
ATTORNEYS

UNITED STATES PATENT OFFICE.

WARREN WILLET, OF FORT ERIE, ONTARIO, CANADA, AND OTIS E. BOWEN, OF BUFFALO, NEW YORK.

AUTO TURN-JACK.

1,088,953.  Specification of Letters Patent.   Patented Mar. 3, 1914.

Application filed February 7, 1913. Serial No. 746,730.

*To all whom it may concern:*

Be it known that we, WARREN WILLET, a citizen of the United States, and resident of Fort Erie, in the Province of Ontario and Dominion of Canada, and OTIS E. BOWEN, a citizen of the United States, and resident of Buffalo, in the county of Erie and State of New York, have invented new and useful Improvements in Auto Turn-Jacks, of which the following is a specification.

This invention relates to a truck and lifting device designed more particularly for use in garages, automobile show rooms, repair shops and tire agencies, for turning and placing automobiles without the use of their motors or a turn table.

One of the objects of our invention is the provision of a compact and powerful auto turn jack of this character capable of making a comparatively short turn, in order to permit automobiles to be turned and stored within a relatively small space.

A further object is to provide the truck with a quick-adjusting lifting device of simple and inexpensive construction which permits the same to be readily adjusted to cars of different makes.

Figure 1:
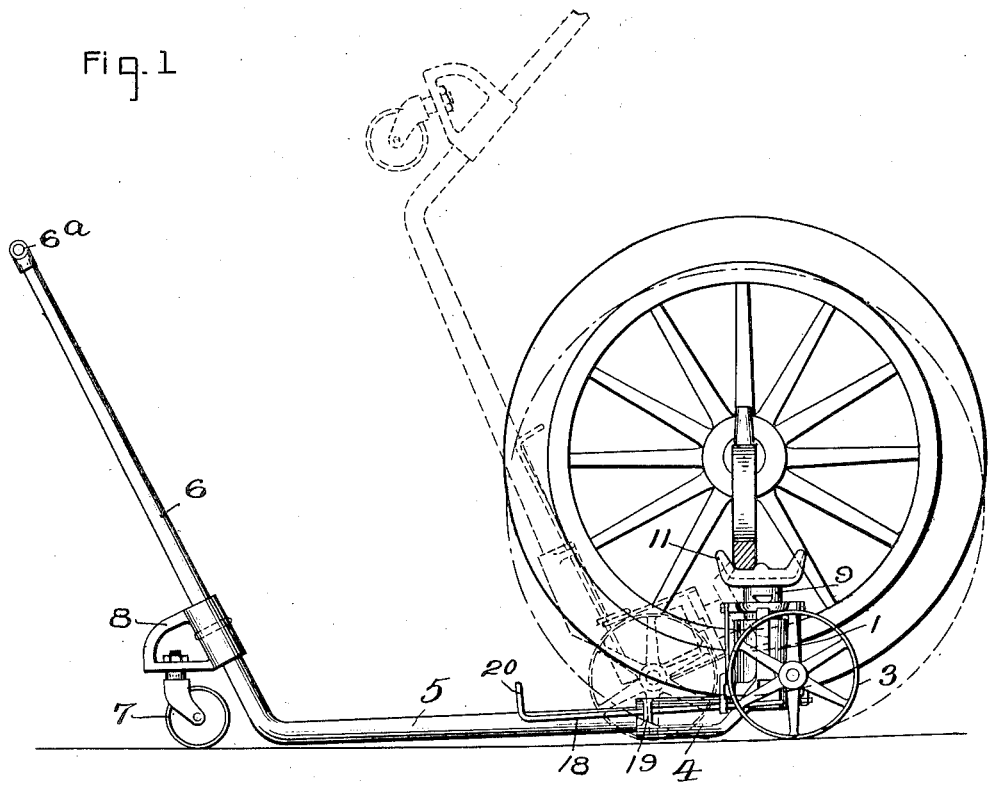
Figure 2:
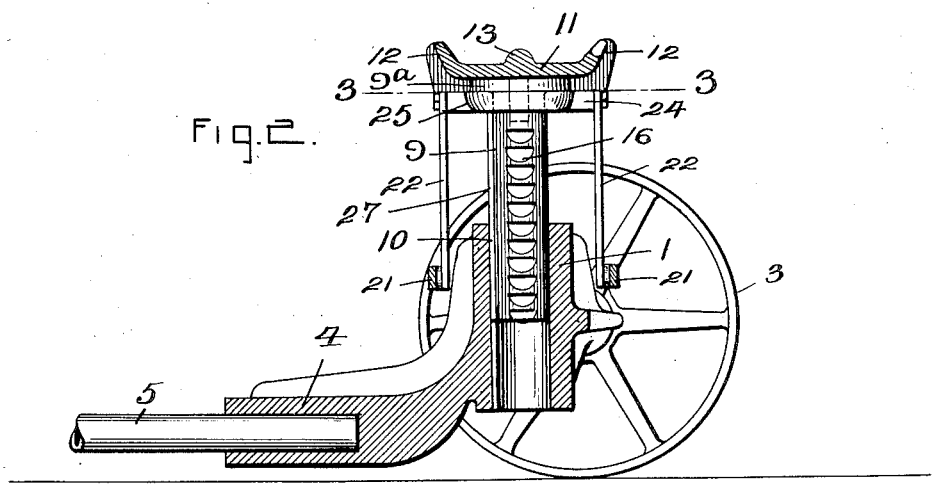

In the accompanying drawings consisting of two sheets: Figure 1 is a side elevation of the improved lifting truck. Fig. 2 is an enlarged longitudinal section of the main portion of the truck, the plane of the section being on line 2—2, Fig. 3. Fig. 3 is a horizontal section on line 3—3, Fig. 2. Fig. 4 is a transverse vertical section on line 4—4, Fig. 3. Fig. 5 is a transverse vertical section on line 5—5, Fig. 3.

Similar characters of reference indicate corresponding parts throughout the several views.

1 indicates the main frame of the truck which may be of any suitable construction. This frame carries a pair of axle-spindles or stubs 2 upon which the truck-wheels 3 are journaled. Extending forwardly from the central portion of the frame 1 is a substantially horizontal socket 4 in which is firmly secured the rear portion 5 of a handle-lever 6. The rear portion 5 of this lever is substantially horizontal, while its front portion 6 extends upwardly at a convenient angle to the rear portion, as shown, and terminates in a suitable handle $6^a$. The horizontal portion 5 extends along the floor a sufficient distance to clear all parts or obstructions, such as the bumper of the automobile and the rods which connect the vehicle springs when the lever is tilted up to place the truck under the automobile axle. The front portion of the handle-lever is supported by a caster 7 swiveled to a bracket 8 secured to the inclined portion of the lever.

9 indicates a standard mounted on the truck frame and consisting preferably of a vertically-sliding plunger or jack guided in an upright barrel or socket 10 which may be cast integral with the truck frame 1, this socket being located centrally on the frame preferably a short distance in advance of the plane of the axle-spindles, as shown. At its upper end the plunger carries a swiveling head or platform 11 adapted to engage under the front or the rear axle of an automobile when the device is used for lifting and transporting such vehicles. In the preferred construction shown, the platform is provided at its front and rear edges with upwardly turned flanges 12 and midway between said flanges with a raised transverse rib 13 between which and one of the flanges the axle is confined. The plunger is free to slide upwardly without restraint for quickly adjusting it to the desired height to engage the automobile-axle and is locked in position by suitable detent means, the devices shown consisting of a pair of detent pawls 14 pivoted by transverse pins 15 in the recessed upper end of the barrel 10. These pawls interlock with ratchet bars or teeth 16 formed in opposite sides of the plunger, as shown in Fig. 5, the pawls being yieldingly held in engagement with the teeth by springs 17 of any suitable construction.

Any suitable means may be employed for raising the plunger, but we prefer to accomplish this by the devices shown in the drawings which are constructed as follows: 18 indicates a rock shaft arranged lengthwise on one side of the socket 4 and the horizontal portion 5 of the handle-lever and supported in bearings 19 carried by said socket and the main frame 1. This shaft is provided at its front end with an arm 20 for turning it. Secured to the rear portion of this shaft on the front and rear sides of the barrel 10 are a pair of rock arms 21 pivotally connected by links 22 with horizontal studs or bolts 23 projecting from the front and rear sides of a lifting ring 24. This ring loosely surrounds the plunger 9 and is adapted to abut against a shoulder 9$^a$ thereof. By this construction, upon swinging the handle 20 upwardly, the ring 24 is caused to raise the plunger which is automatically locked at the desired elevation by the detent pawls 14.

The ring 24 is beveled on its underside, as shown at 25, and the pawls 14 are provided with correspondingly beveled noses 26, so that upon forcibly depressing the ring 24, the pawls are deflected out of engagement with the plunger, releasing the latter and allowing it to drop to its lowest position. This downward movement of the releasing ring 24 is most conveniently effected by depressing the rock arm 20 by means of the operator's foot.

In order to hold the plunger from turning in its socket, it is provided with a longitudinal key or feather 27 which engages a corresponding groove in the bore of the socket.

In the use of the truck or jack, the plunger 9 is dropped to its lowermost position and the truck is then rolled under one of the axles of the automobile with its handle lever 5, 6, tilted upwardly and rearwardly to the position shown by dotted lines in Fig. 1. The plunger is next raised until its head comes in contact with the axle, this being quickly done by swinging the rock arm 20 upwardly, as hereinbefore described. The operator then lowers the lever to the position shown by full lines in Fig. 1, whereby the plunger or standard 9 is swung from its tilted to its upright position and the adjacent portion of the car is raised clear of the ground, as shown by full lines in Fig. 1. By seizing the handle 6$^a$ of the lever, the truck with the vehicle supported thereon can now be rolled forward or backward or turned in either direction to properly place the car in the garage, store room, repair shop, or other building.

The long handle-lever 5, 6, affords a powerful leverage which enables one person to lift an ordinary sized car with comparative ease.

By providing the handle-lever with a relatively long horizontal rear portion 5, as shown, it not only clears the bumper and other obstructions at the front of the car, when tilted up, but when the lever is lowered it can be swung laterally under the raised wheels of the car as far back as the foot board, if desired, permitting a very short turn to be made and enabling cars to be placed closely together without inconvenience and to be as easily removed from their place of storage. For this purpose, the front or lowest portion of the lever-part 5 which passes under the raised wheels of the car, is preferably arranged below the plane of the axles of the frame-supporting wheels 3, as shown in Fig. 1.

To remove the lifting truck from the car, the handle lever is tilted up to the position shown by dotted lines in Fig. 1, thus lowering the raised portion of the car. The truck is then withdrawn from under the car and the raised plunger is lowered to its former position.

Our improved lifting truck is simple in construction, rendering it inexpensive to manufacture, while its compactness, powerful leverage and quick adjustment render it especially desirable for turning and placing cars in garages and other buildings where a comparatively large number of automobiles have to be stored.

We claim as our invention:

1. An auto turn jack comprising a frame having supporting wheels constructed to sustain the same clear of the floor, a standard rising from said frame, and a handle-lever attached to said frame and having a substantially horizontal rear portion extending forwardly from the frame, the lowest portion of said handle-lever being arranged below the plane of the axles of said wheels, to permit the same to pass under the raised wheels of an automobile.

2. An auto turn jack comprising a frame having supporting wheels constructed to sustain the same clear of the floor, a standard rising from said frame, and a handle-lever attached to said frame and having a substantially horizontal rear portion extending forwardly from the frame and a front portion rising from the horizontal rear portion, the lowest portion of said handle-lever being arranged below the plane of the axles of said wheels, to permit the same to pass under the raised wheels of an automobile.

3. An auto turn jack comprising a frame having supporting wheels constructed to sustain the same clear of the floor, a standard rising from said frame, and a handle-lever attached to said frame and having a substantially horizontal rear portion extending forwardly from the frame and a front portion rising from the horizontal rear portion, the lowest portion of said handle-lever being arranged below the plane of the axles of said wheels, said rear portion extending forwardly from said wheeled frame a sufficient distance to permit said front portion to clear the raised automobile wheels when the rear portion of said lever is swung thereunder.

Witness my hand this 31st day of January, 1913.

WARREN WILLET.

Witnesses:
 HANS WENIGER,
 ALEX. WALTER.

Witness my hand this 29th day of January, 1913.

OTIS E. BOWEN.

Witnesses:
 C. F. GEYER,
 E. M. GRAHAM.